(12) United States Patent
DeRoller

(10) Patent No.: US 8,482,776 B2
(45) Date of Patent: Jul. 9, 2013

(54) METHOD AND SYSTEM FOR TRACKING THE STATUS OF A REMOTE RENDERING JOB

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 498 days.

(21) Appl. No.: 12/875,212

(22) Filed: Sep. 3, 2010

(65) Prior Publication Data

US 2012/0057189 A1    Mar. 8, 2012

(51) Int. Cl.
*G06F 3/12*    (2006.01)
*G06K 15/00*    (2006.01)

(52) U.S. Cl.
USPC ......... 358/1.15; 358/1.13; 358/1.18; 358/402

(58) Field of Classification Search
None
See application file for complete search history.

(56) References Cited

U.S. PATENT DOCUMENTS

| | | | |
|---|---|---|---|
| 6,522,421 B2 * | 2/2003 | Chapman et al. | 358/1.15 |
| 6,975,419 B2 * | 12/2005 | Staas et al. | 358/1.15 |
| 7,424,479 B2 | 9/2008 | Nguyen | |
| 7,701,602 B2 | 4/2010 | Burke et al. | |
| 7,725,130 B2 | 5/2010 | Silverbrook et al. | |
| 2008/0007791 A1 * | 1/2008 | Nagarajan et al. | 358/402 |
| 2008/0062454 A1 * | 3/2008 | Bostick et al. | 358/1.15 |

* cited by examiner

*Primary Examiner* — Dov Popovici
(74) *Attorney, Agent, or Firm* — Kermit D. Lopez; Luis M. Ortiz; Melissa Silverstein

(57) ABSTRACT

A system and method for tracking a remote rendering job status within a network. A rendering job in association with address information of a desired rendering device can be transmitted to a mobile print server via a print job submission tool. A tracking email message including one or more action links with respect to the rendering job can be presented to a user in order to track the status of the rendering job. A command can be transmitted back to the mobile print server via an email message by accessing the action link provided in association with the tracking email message. Such an approach provides an effective print governance solution in a wide range of remote rendering applications.

20 Claims, 8 Drawing Sheets

Web Browser   — □ ×   500

From: MobilePrint14@sdi.xerox.org   Sent: Wed 3/31/2010 11:20 AM

To: DeRoller, Matthew

Subject: Confirmation Number: 693437 Printer IP 13.212.24.24

Your Print Job has been rejected for the following reasons:

- User mderoller is not authorized to print color device 13.121.24.24

Please choose the appropriate action below:

Change Document to B&W and print to 13.121.24.24

Print to alternative Device located at Bldg 111 column N8

Cancel Document (Print job will be removed from mobile print queue)

Thank you.

*FIG. 5*

METHOD AND SYSTEM FOR TRACKING THE STATUS OF A REMOTE RENDERING JOB

TECHNICAL FIELD

Embodiments are generally related to rendering devices such as, for example, printers, scanners, photocopy machines, multi-function devices, and the like. Embodiments are additionally related to the tracking of a remote rendering job status within a network.

BACKGROUND OF THE INVENTION

Networked rendering devices can interact with an assemblage of other rendering devices, client devices, servers, and other components that are connected to and communicate over a network. One example of a rendering device is a MFD (Multi-Function Device) which includes the functionality of multiple rendering devices such as printers, scanners, faxes, copy machines, and so forth. Each MFD in a network, for example, can include a variety of print capability options such as finishing, media quality, supply levels and size. Such networked rendering devices can be communicatively linked with a mobile communication device in order to provide various operations such as, for example, printing, scanning, and other operations within the network.

The mobile communication device can include a rendering job submission tool such as, for example, an email application that permits a user to render a job from the mobile device. For example, a rendering job can be submitted as an email attachment and a desired rendering device can be selected by including an IP (internet protocol) address and/or a "friendly name" associated with the rendering device in the email. The rendering job can also be submitted to a general mobile print queue and then released at the desired rendering device via a "Follow Me" print technology (e.g., extensible interface platform). As the rendering job in such mobile rendering applications are remotely submitted via a web-based system, it is highly desirable to track the status of the rendering job within the network.

Most prior art approaches for tracking the rendering job status employs an output management application which permits a print agent to create and enforce a set of rules for tracking the rendering job status within the network. Such print agent generates a pop-up message that indicates a tracking action and option with respect to the rendering job associated with an office worker. Such prior art approaches, however, are unable to track the status information with respect to a remote rendering job that are submitted from outside a traditional centralized office.

Based on the foregoing, it is believed that a need exist for an improved system and method for tracking a mobile rendering job status within a network, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a networked rendering device such as, for example, a printer, scanner, photocopy machine, fax machine, and/or a MFD.

It is another aspect of the disclosed embodiments to provide for an improved system and method for tracking a remote rendering job status within a network.

It is a further aspect of the disclosed embodiments to provide for an improved system and method for providing a print governance interaction with respect to a remote rendering environment.

The aforementioned aspects and other objectives and advantages can now be achieved as described herein. A system and method for tracking a remote rendering job status within a network is disclosed herein. A rendering job in association with address information (e.g., an Internet Protocol (IP) address, a friendly name, etc.) of a desired rendering device can be transmitted to a mobile print server via a print job submission tool (e.g., an email application). A tracking email message including one or more action links with respect to the rendering job can be presented to a user in order to track the status of the rendering job. A command can be transmitted back to the mobile print server via an email message by accessing the action link provided in association with the tracking email message. Such an approach provides an effective print governance solution in a wide range of remote rendering applications.

The remote rendering job with respect to the rendering device can be transmitted via a mobile communication device such as a PDA, a laptop, etc. The rendering job can be transmitted to an appropriate rendering device in the network based on the user command and a confirmation message with respect to the rendering job can also be provided to the user. Such an approach leverages the existing mobile print workflow for tracking the status of the rendering job within the network without any additional software requirement in the mobile communication device. Such a system and method leverages existing mobile print technologies and extends managed print services with respect to a remote and mobile work force.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 5 illustrates a GUI of a tracking email message with respect to the remote rendering job, in accordance with the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
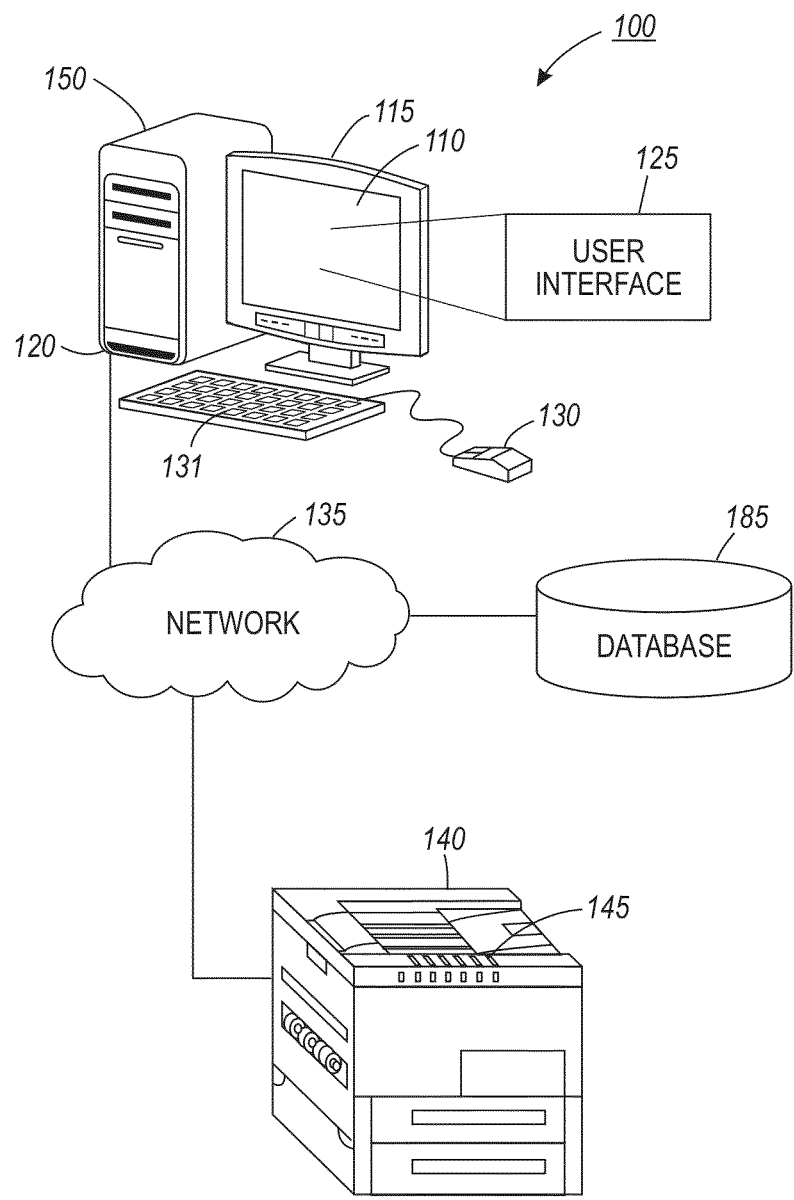
FIG. 1 illustrates an example of a rendering device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a rendering device 140 coupled to a data-processing apparatus 110 through a network 135. In some embodiments, rendering device 140 may be a rendering device such as a printer, scanner, copy machine, etc. In other embodiments, rendering device 140 may be a MFD. The data-processing apparatus 110 may be, for example, a personal computer or other computing device and generally includes a central processor 120, a display device 115, a keyboard 131, and a pointing device 130 (e.g., mouse, track ball, pen device, or the like). Additional input/output devices such as the rendering device 140 may be included in association with the data-processing apparatus 110 as desired.

Figure 2:
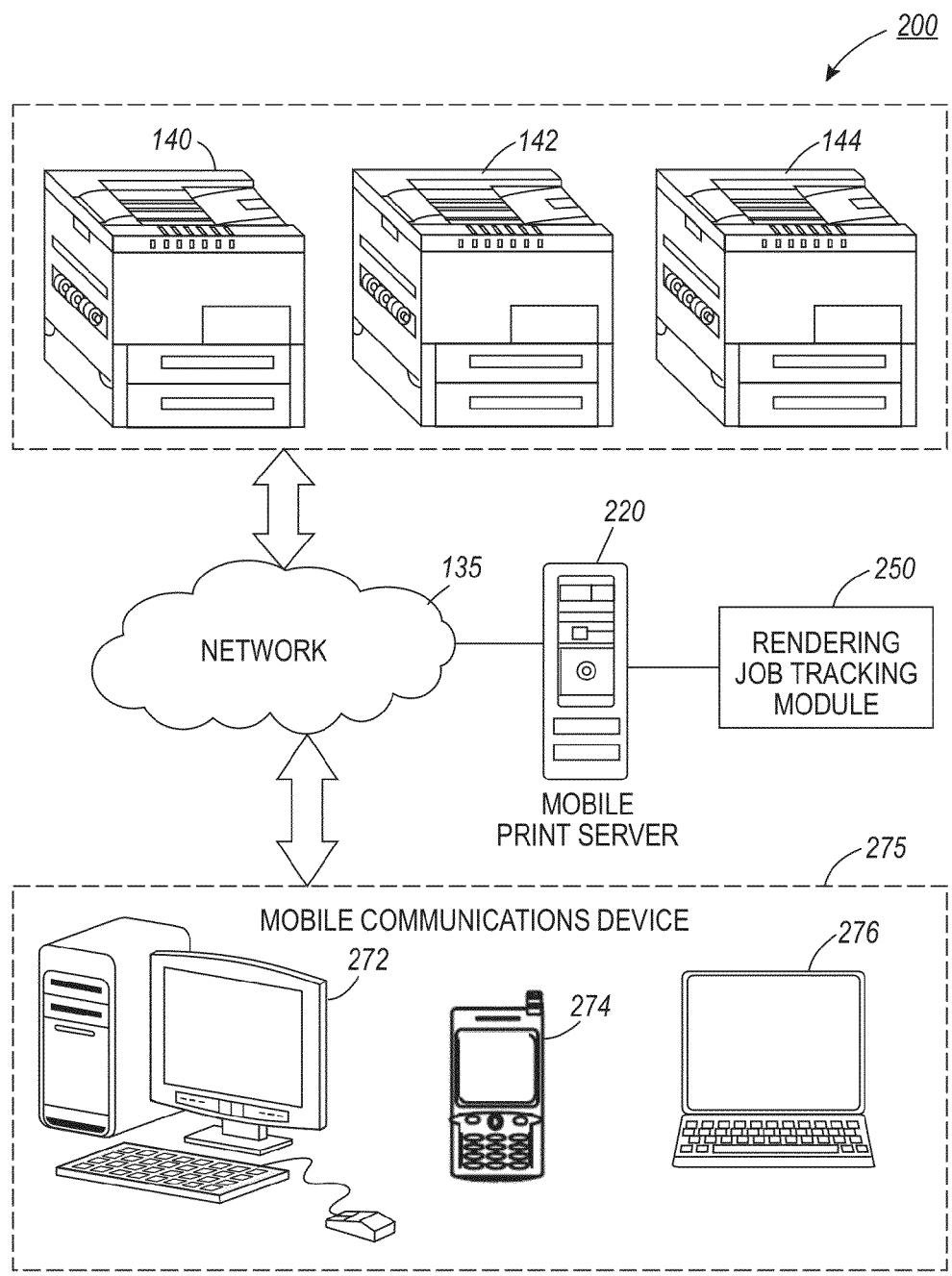
FIG. 2 illustrates a block diagram of a remote rendering job tracking system associated with various client devices and networked rendering devices, in accordance with the disclosed embodiments.

Note that as utilized herein, the term rendering device may refer to an apparatus or system such as a printer, scanner, fax machine, copy machine, etc., and/or a combination thereof (e.g., a MFD). Preferably, rendering device 140 is a MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions such as scanning, faxing, printing and copying. Note that the rendering devices 142 and 144 illustrated herein with respect to FIG. 2 are generally analogous or similar to rendering device 140.

A non-limiting example of a MFD that can be utilized as rendering devices 140, 142, and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as rendering devices 140, 142, and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as rendering devices 140, 142, and/or 144 is disclosed in U.S. Pat. No. 5,920,405, entitled "Multifunction Device with Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. Network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The rendering device 140 includes a user interface 145 such as a panel menu. The panel menu may be used to select features and enter other data in the rendering device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through the device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

Note that the user interface as utilized herein generally refers to a type of environment that represents programs, files, options, and so forth by means of graphically displayed icons, menus, and dialog boxes on a screen. The input device of the rendering device 140, for example, may be a local user interface 125 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA) or the like, as noted above.

The following description is presented with respect to embodiments of the present invention, which can be embodied in the context of a data-processing apparatus 110 and rendering device 140 depicted in FIG. 1. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

FIG. 2 illustrates a block diagram of a remote rendering job-tracking system 200 associated with various client devices and network-accessible devices, in accordance with the disclosed embodiments. The system 200 generally includes one or more rendering devices such as, for example, devices 140, 142, and/or 144, which can provide one or more designated operations such as printing, scanning, and/or device discovery operations. Rendering devices 140, 142, and/or 144 may each be, in some embodiments, a distinct MFD. The system also includes one or more client devices 275 such as, for example, a personal computer 272, a laptop computer 276 or another computing apparatus or system 274 (e.g., wireless cellular telephone, Smartphone, etc) that are operatively configured in association with the network 135. The client devices 275 communicate with the rendering device 140 through the computer network 135.

A mobile print server 220 is configured in association with a rendering job tracking module 250 for tracking remote rendering job status within the network 135. The mobile print server 220 can be typically employed to transmit the remote rendering job along with address information of the rendering device 140 from the mobile communication device 275 to the mobile print sever 220. The mobile print server 220 provides data such as boot files, operating system images, and applications to the client device 275. Specifically, clients may connect to any member of a network of mobile print server 220, which provides equivalent content. In the depicted example, the mobile print server 220 connects to and communicates with the network 135 along with the rendering job tracking module 250.

Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as USB drives, Flash Drives, hard disk drives, CD ROMs, CD-Rs, DVDs, etc., and transmission media such as digital and/or analog communication links. Examples of transmission media can also include devices such as modems which permit information to be transmitted over standard telephone lines and/or the more advanced digital communications lines.

Figure 3:
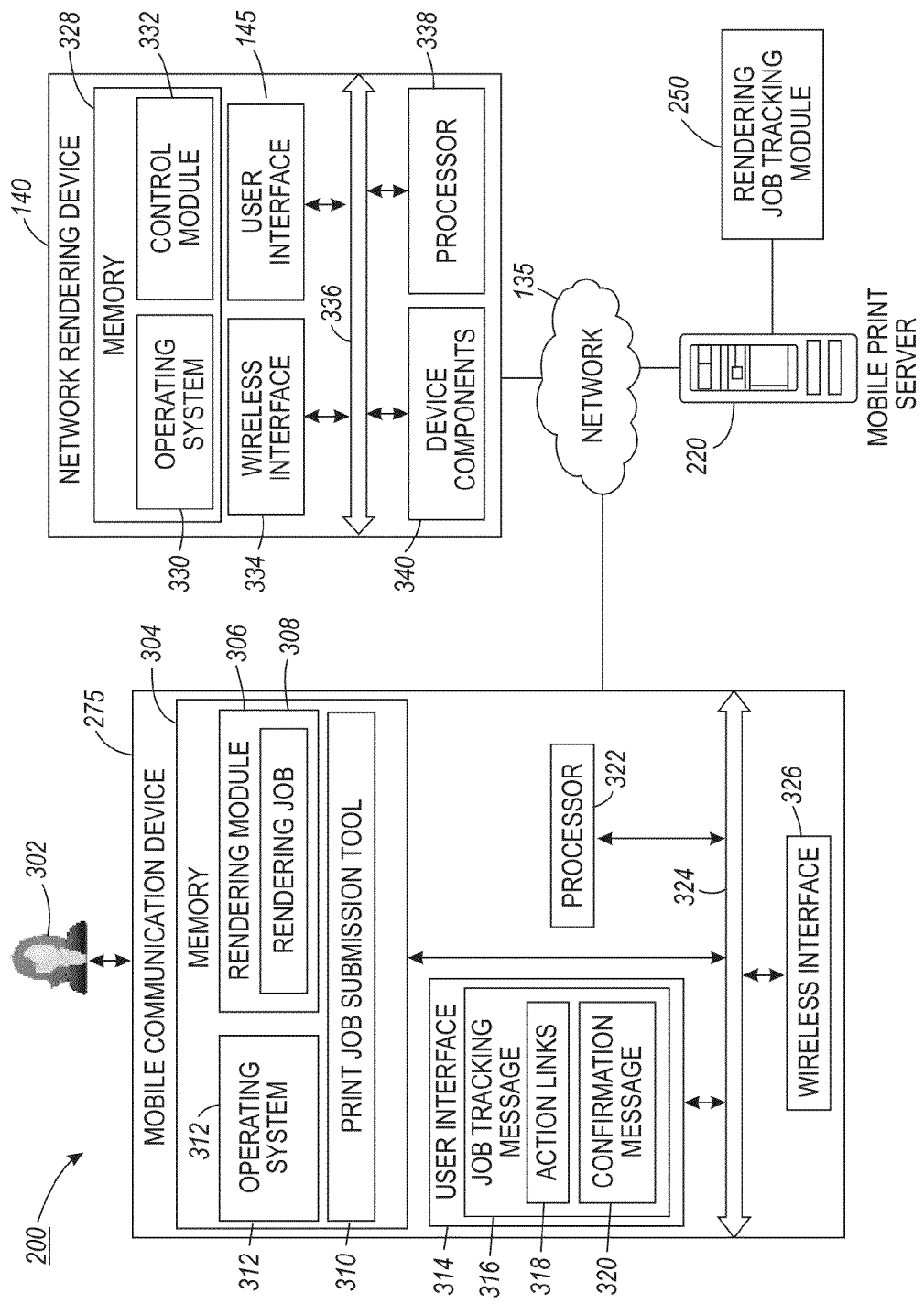
FIG. 3 illustrates a block diagram of the remote rendering job tracking system, in accordance with the disclosed embodiments.

FIG. 3 illustrates a block diagram of the remote rendering job-tracking system 200, in accordance with the disclosed embodiments. Note that that in FIGS. 1-8, identical or similar blocks are generally indicated by identical reference numerals. The rendering job tracking system 200 provides a feedback on the progress and status of the remote rendering job 308 in a wide range of remote rendering applications. The tracking system 200 including the mobile print server 220 permits a user 302 to access the rendering device 140 in a non-office environment such as an airport lounge, hotel, university campuses, conference centers, libraries, and hotels.

The tracking system 200 includes the mobile communication device 275, the multifunction device 140, and the mobile print server 220 that are communicated through the network 135. The mobile communication device 275 can be, for example, a Smartphone, a personal digital assistant (PDA), and the like which offers a wide range of capabilities including storing and editing documents, receiving and sending electronic mails, and storing/viewing images. The mobile communication device 275 includes a user interface 314, a memory 304, and a processor 322 coupled to a local interface 324.

The local interface 324 can be, for example, a data bus with an accompanying control/address bus. A wireless interface 326 facilitates wireless communication with the rendering device 140, the mobile print server 220, and other wireless devices and/or networks. The memory 304 stores several components that are executable by the processor 322. The components include, for example, an operating system 312, a print job submission tool 310, and a rendering module 306.

The rendering device 140 includes a processor circuit having a memory 328 and a processor 338 coupled to a local interface 336. The memory 328 stores an operating system 330 and a control module 332 that are executable by the processor 338. The rendering device 140 also includes various rendering device components 340 such as motors and mechanical paper path components as well as image creation components. A wireless network interface 334 coupled to the local interface 336 facilitates wireless communication with respect to the rendering device 140.

The mobile print server 220 receives the rendering job 308 in association with address information (e.g., an IP address, a friendly name) of a desired rendering device 140 via the print job submission tool 310. Note that the print job submission tool 310 can be, for example, an email application. The address information associated with the rendering device 140 can include an Internet protocol (IP) address or a friendly name with respect to the rendering device 140. The tracking module 250 provides enhanced usability and interaction to the user 302 without any additional software requirement in the mobile communication device 275. The tracking module 250 further provides a job tracking email message 316 including one or more action links 318 with respect to the rendering job 308 in order to track the status of the rendering job 308.

The user 302 further accesses the tracking message 316 by clicking the action link 318 provided in the tracking message 316 and transmits a user command back to the mobile print server 220 via an email message. Note that the user interface 314 and/or 145 may be implemented utilizing a GUI such as, for example, the GUI 125 depicted in FIG. 1 herein, and may be provided by a module such as, for example, a software application module. User interface 314 and/or 145 can be displayed via a display device such as, for example, the monitor 115 depicted in FIG. 1. Such system 200 provides an effective print governance solution in a wide range of remote rendering applications.

Figure 4:
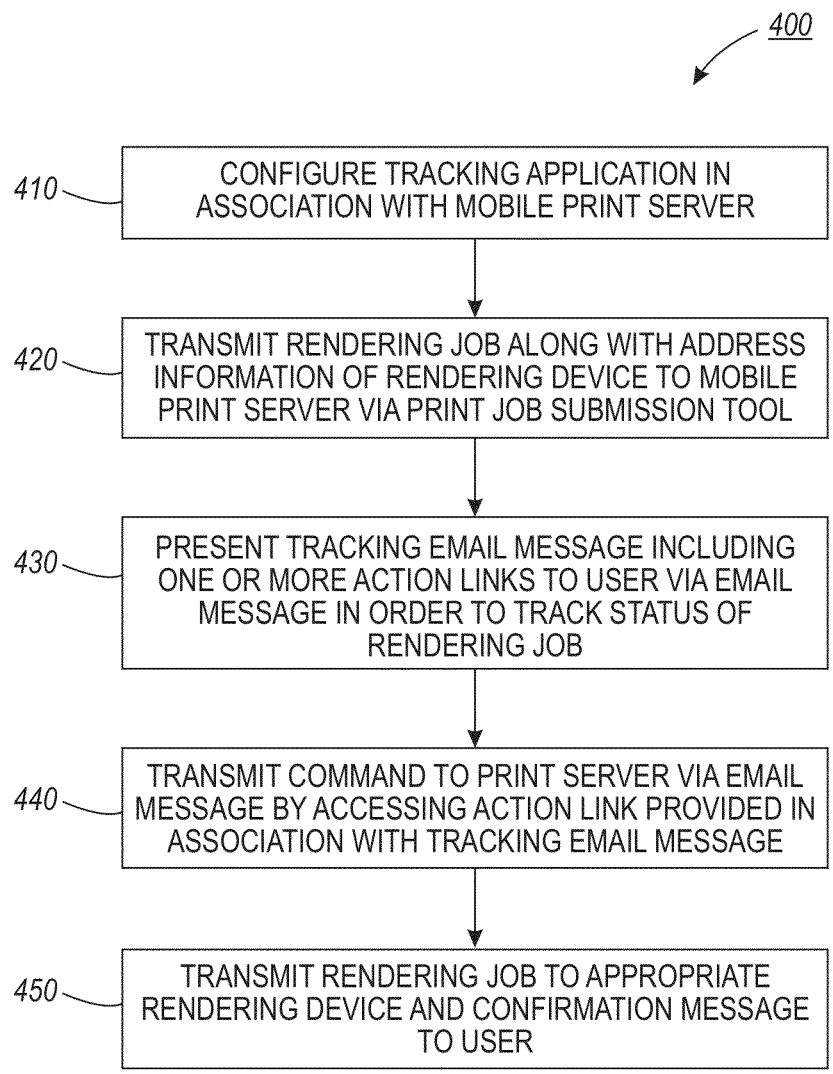
FIG. 4 illustrates a high level flow chart of operation illustrating logical operational steps of a method for tracking status of a remote rendering job in a network, in accordance with the disclosed embodiments.

FIG. 4 illustrates a high level flow chart of operation illustrating logical operational steps of a method 400 for tracking the status of the rendering job 308 in the network environment 135, in accordance with the disclosed embodiments. Note that the method 400 can be implemented in the context of a computer-useable medium that contains a program product including, for example, a module or group of modules. The tracking module 250 can be configured in association with the mobile print server 220 in order to receive and track the rendering job 308 from the mobile communication device 275, as illustrated at block 410. The rendering job 308 in association with the address information, such as the IP address and a friendly name of a desired rendering device 140, can be thereafter transmitted to the mobile print server 220 via the print job submission tool 310, as depicted at block 420.

The tracking message 316 including one or more action links 318 with respect to the rendering job 308 can be presented to the user 302 via the email message in order to track the status of the rendering job 308, as indicated at block 430. Further, the user command with respect to the rendering job 308 can be transmitted back to the mobile print server 220 by accessing the action link 318 provided in association with the tracking email message 316, as illustrated at block 440. The rendering job 308 can be transmitted to the appropriate rendering device 140 based on the command and the confirmation message 320 with respect to the rendering job 308 and can be sent to the user 302 in order provide effective print governance solution with respect to the network 135, as indicated at block 450. Such a system and method leverages existing mobile print technologies and extends managed print services with respect to a remote and mobile work force.

Note that programs defining functions with respect to the disclosed embodiments may be delivered to a data storage system or a computer system via a variety of signal-bearing media which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including, for example, Ethernet, the Internet, wireless networks, other networked systems. Thus, the method 400 described herein can be deployed as process software in the context of a computer system or data-processing system as that depicted in FIGS. 1-2.

FIG. 5 illustrates a GUI of the tracking message 500 with respect to the rendering job 308, in accordance with the disclosed embodiments. Again as a reminder, note that in FIGS. 1-8, identical or similar parts are generally indicated by identical reference numerals. Note that the GUI 500, 550, 600, and/or 650 can be implemented utilizing a GUI such as, for example, the GUI 125 depicted in FIG. 1 herein and may be provided by a module such as, for example, module 250 (i.e., a software application). GUI 500, 550, 600, and/or 650 can be displayed via a display device such as monitor 115 depicted in FIG. 1. In the illustrated figures herein, 500, 550, 600, and/or 650 are generally implemented in the context of a GUI "window". Note that in computing, a GUI window is generally a visual area containing some type of user interface (e.g., GUI 125). Such a "window" usually (but not always) possesses a rectangular shape and displays the output of and may allow input to one or more processes. Such windows are primarily associated with graphical displays where they can be manipulated with a mouse cursor such as, for example, the pointing device 130 depicted in FIG. 1. A GUI using windows as one of its main "metaphors" is often referred to as a windowing system.

The rendering job tracking module 250 associated with the mobile print server 220 leverages the existing mobile print workflow for tracking the status of the rendering job 308 within the network 135. The tracking message 316 includes action links 318 that facilitates the user 302 to select an appropriate command with respect to the rendering job 308. Note that the action links 318 can be a hyperlink (or link), which is a reference to a document that the reader can directly follow, or that is followed automatically. The reference points to a whole document or to a specific element within a document. Hypertext is text with hyperlinks. Such text can be usually viewed with the data-processing system 100. A hyperlink has an anchor, which is a location within a document from which the hyperlink can be followed; that document is known as its source document. The target of a hyperlink is the document, or location within a document, that the hyperlink leads to. The user can follow the link when its anchor is shown by activating it in some manner (e.g., often, by touching it or clicking on it with a pointing device). The tracking message 316 with respect to the rendering job 308 can be transmitted via the email message to the mobile communication device 275. The action links 318 associated with the tracking message 316 can be presented as an email links in the email message.

Figure 6:
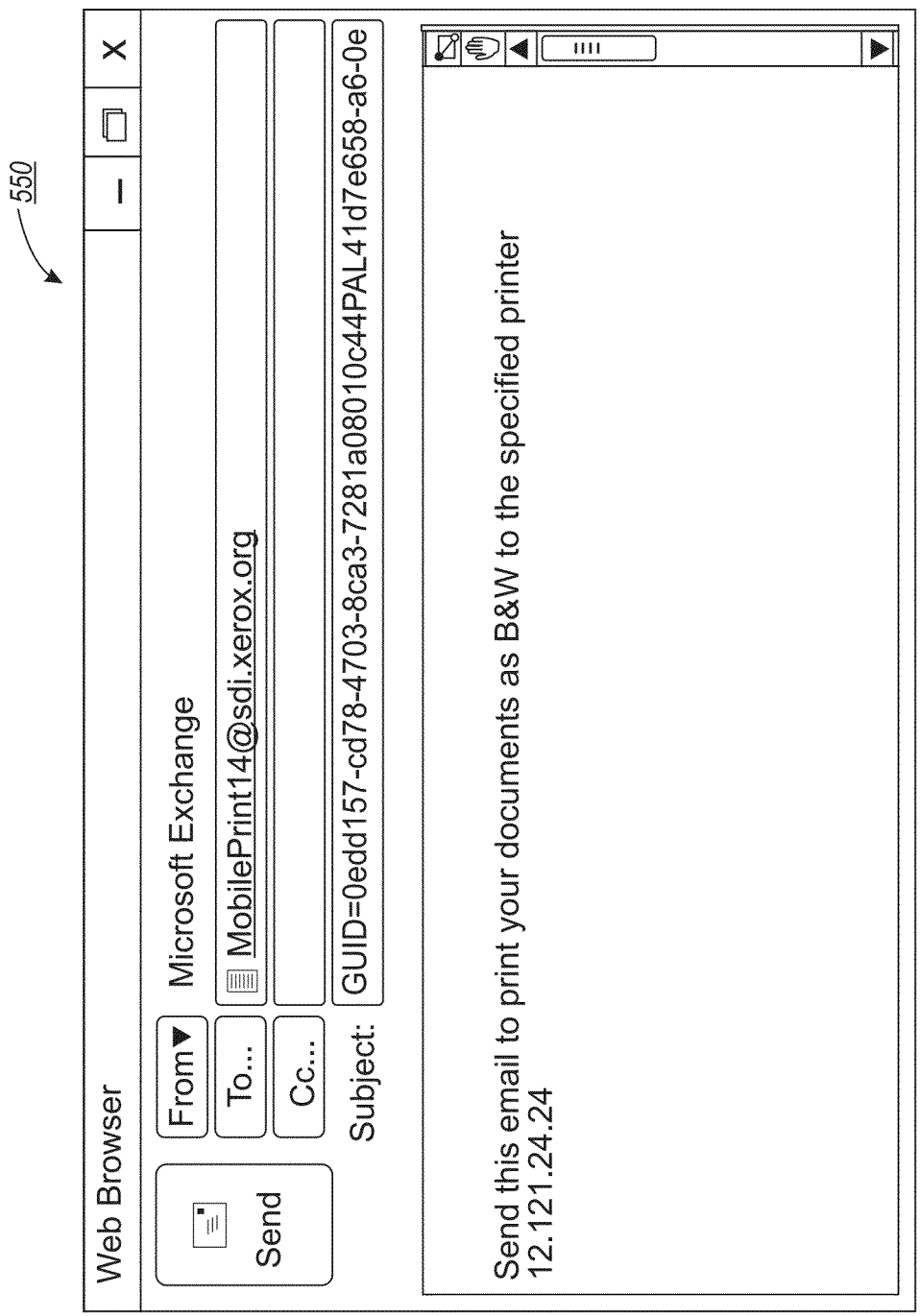
FIGS. 6-8 illustrate a GUI of an email message generated in response to the tracking message utilizing an action link provided in the tracking message, in accordance with the disclosed embodiments.
Figure 7:
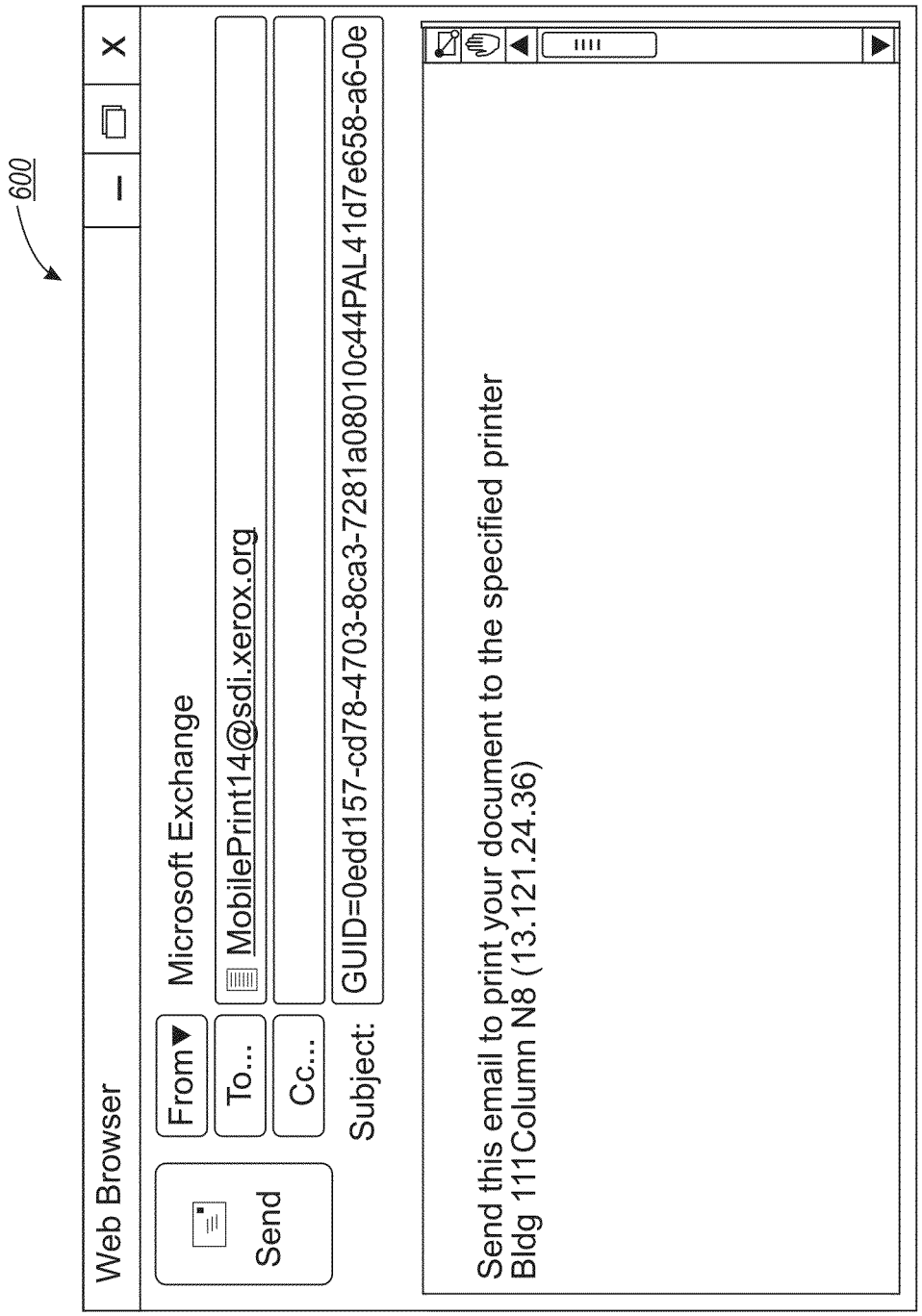
Figure 8:
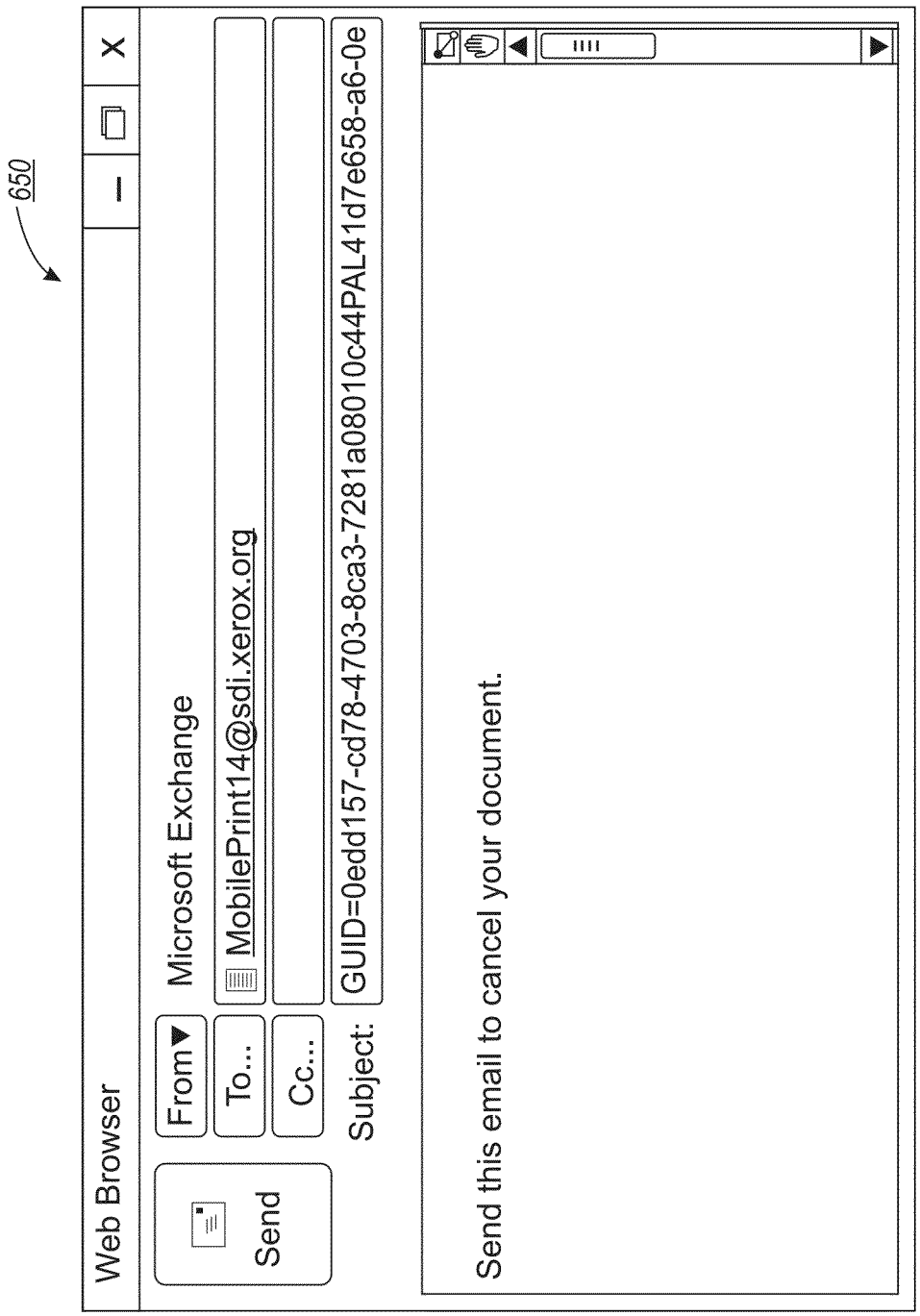

FIGS. 6-8 illustrate GUI 550, 600, and 650 of an email message generated in response to the tracking message 500 utilizing the action links 318 provided in the tracking message 500, in accordance with the disclosed embodiment. Note that the term interface as utilized herein generally refers to a type of environment that represents programs, files, options, and so forth by means of graphically displayed icons, menus, and dialog boxes on a screen. The user can interact with the GUI to select and activate such options by pointing and clicking with a user input device such as, for example, a touch screen, a key board, a mouse, and so forth. A particular item may function in the same manner to the user in all applications because the user interface provides standard software routines to handle these elements and reports the user's actions.

The GUI 550 illustrates the action message for changing the format of rendering such as, for example, changing a color rendering format to a black and white rendering format with respect to the rendering device 140. The GUI 600 illustrates the action message for selecting an alternative rendering device 140 in the network environment 135. The GUI 650 illustrates the action message for terminating the rendering process in the tracking system 200. The system and method therefore effectively enables the remote or mobile workforce in a non-office environment to receive the feedback and status of the rendering device as well as detailed information on the completed steps involved in servicing the submitted rendering jobs.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for tracking a status of a remote rendering job, said method comprising:

transmitting a rendering job in association with an address information of a networked rendering device to a mobile print server via a print job submission tool in order to render said rendering job within a network;

presenting a tracking email message including at least one action link with respect to said rendering job in order to track the status of said rendering job; and transmitting a command to said mobile print server via an email message by accessing said at least one action link associated with said tracking email message thereby providing an enhanced print governance solution with respect to a remote rendering application.

2. The method of claim 1 further comprising providing said rendering job to an appropriate rendering device based on said command in order to thereafter present a confirmation message with respect to said rendering job.

3. The method of claim 1 further comprising presenting said at least one action link associated with said tracking email message as an email link in association with said tracking email message.

4. The method of claim 1 wherein said address information with respect to said networked rendering device comprises an internet protocol address.

5. The method of claim 1 wherein said address information with respect to said networked rendering device comprises a friendly name.

6. The method of claim 1 wherein said address information with respect to said networked rendering device comprises at least one of the following types of information:
an internet protocol address; and
a friendly name.

7. The method of claim 1 wherein said print job submission tool comprises an email application.

8. A system for tracking status of a remote rendering job, said system comprising:
a processor;
a data bus coupled to said processor; and
a computer-usable medium embodying computer program code, said computer-usable medium being coupled to said data bus, said computer program code comprising instructions executable by said processor and configured for:
transmitting a rendering job in association with an address information of a networked rendering device to a mobile print server via a print job submission tool in order to render said rendering job within a network;
presenting a tracking email message including at least one action link with respect to said rendering job in order to track a status of said rendering job; and
transmitting a command to said mobile print server via an email message by accessing said at least one action link associated with said tracking email message thereby providing an enhanced print governance solution with respect to a remote rendering application.

9. The system of claim 8 wherein said instructions are further configured for providing said rendering job to an appropriate rendering device based on said command in order to thereafter present a confirmation message with respect to said rendering job.

10. The system of claim 8 wherein said instructions are further configured for presenting said at least one action link associated with said tracking email message as an email link in association with said tracking email message.

11. The system of claim 8 wherein said address information with respect to said networked rendering device comprises an internet protocol address.

12. The system of claim 8 wherein said address information with respect to said networked rendering device comprises a friendly name.

13. The system of claim 8 wherein said address information with respect to said networked rendering device comprises at least one of the following types of information:
an internet protocol address; and
a friendly name.

14. The system of claim 8 wherein said print job submission tool comprises an email application.

15. A system for tracking a status of a remote rendering job, said system comprising:
a processor;
a data bus coupled to said processor; and
a computer-usable medium embodying computer program code, said computer-usable medium being coupled to said data bus, said computer program code comprising instructions executable by said processor and configured for:
transmitting a rendering job in association with an address information of a networked rendering device to a mobile print server via a print job submission tool in order to render said rendering job within a network;
presenting a tracking email message including at least one action link with respect to said rendering job in order to track the status of said rendering job;
transmitting a command to said mobile print server via an email message by accessing said at least one action link associated with said tracking email message thereby providing an enhanced print governance solution with respect to a remote rendering application; and
providing said rendering job to an appropriate rendering device based on said command in order to thereafter present a confirmation message with respect to said rendering job.

16. The system of claim 15 wherein said instructions are further configured for presenting said at least one action link associated with said tracking email message as an email link in association with said tracking email message.

17. The system of claim 15 wherein said address information with respect to said networked rendering device comprises an internet protocol address.

18. The system of claim 15 wherein said address information with respect to said networked rendering device comprises a friendly name.

19. The system of claim 15 wherein said address information with respect to said networked rendering device comprises at least one of the following types of information:
an internet protocol address; and
a friendly name.

20. The system of claim 15 wherein said print job submission tool comprises an email application.

* * * * *